Oct. 1, 1929.　　　F. A. PARSONS　　　1,730,161
TRANSMISSION MECHANISM
Filed Dec. 23, 1925
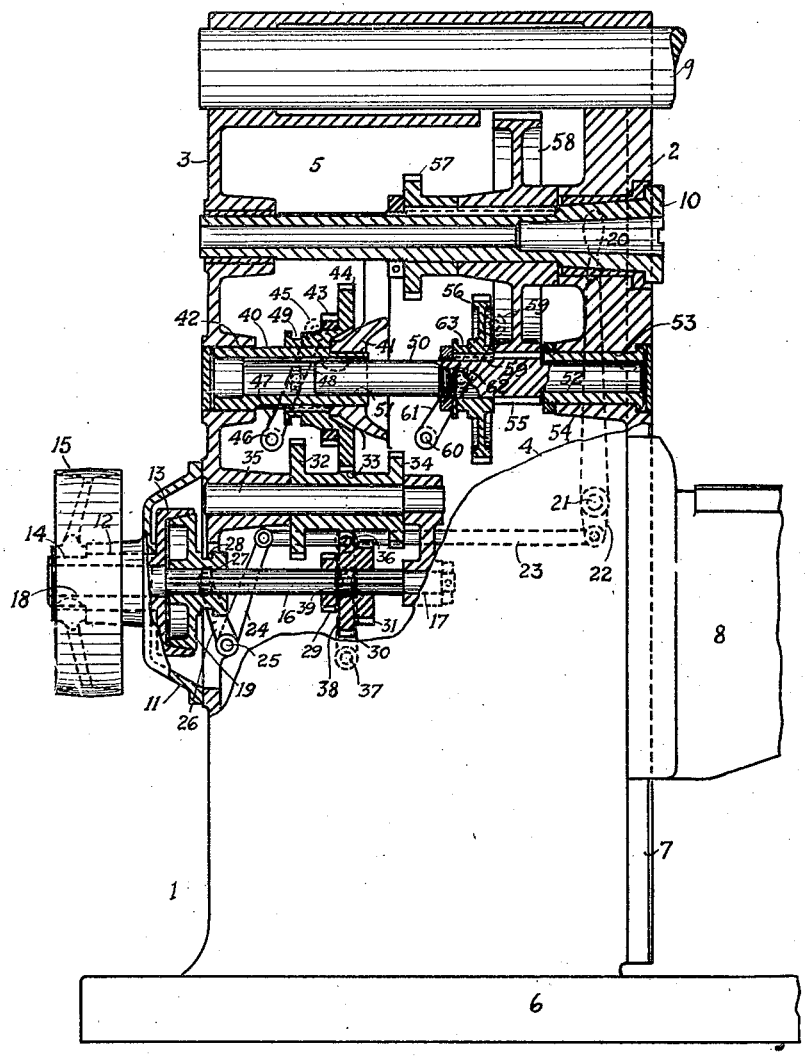
INVENTOR
Fred G. Parsons Patented Oct. 1, 1929

1,730,161

UNITED STATES PATENT OFFICE

FRED A. PARSONS, OF MILWAUKEE, WISCONSIN, ASSIGNOR TO KEARNEY & TRECKER CORPORATION, OF WEST ALLIS, WISCONSIN

TRANSMISSION MECHANISM

Application filed December 23, 1925. Serial No. 77,176.

This invention relates to variable speed transmission gearing.

A main object of the invention is to provide a variable speed transmission train of improved construction particularly adapted for machine tool spindles.

A further purpose is to provide a variable speed spindle train particularly adapted to permit a relatively large ratio between the lowest and highest spindle speed available from the train.

Another purpose is to provide a spindle drive for milling machines which, while providing for certain limitations characteristic of such machines, will permit of relatively great reduction in speed to the spindle from the shaft next thereto in the train.

The invention consists of the construction, arrangement and combination of parts which is particularly described in this specification and pointed out in the claims.

In the drawing is shown the side elevation of the column of a knee and column type milling machine, with which is associated a transmission train embodying the features of this invention, a portion of the column being broken away to more clearly show the spindle and driving train therefor.

Machines of the type here shown ordinarily comprise a hollow frame or column 1, having a front wall 2, a rear wall 3, and side walls 4 and 5 together with a base 6. Vertically slidable on a suitable slideway 7 is a knee 8 which supports a saddle and table together with associated mechanism. The saddle, table and associated mechanism is not shown since the construction thereof is well known and forms no part of the present invention. An overarm 9 is slidable in a suitable bore in the upper part of the column structure. Rotatably supported in suitable bearings in the front wall 2 and rear wall 3 is a tool spindle 10. A bracket 11 fixed on the rear wall 3 of the column provides for rotatably supporting the shank or hub 12 of a clutch member 13, upon a further extension 14 of which, a drive pulley 15 is fixed. A shaft 16, in axial alignment with member 13, is provided at the one end with a bearing 17, for support from the column 1, and at the other end is rotatably supported in an axial bore 18 of the clutch member 13. Slidably keyed on shaft 16 is a clutch member 19 adapted to be moved into frictional engagement with the clutch member 13 or to be moved in the opposite direction to disengage therefrom, movement in either direction being effected by means of a hand lever 20. The hand lever 20 stands outside the wall 5 of the column 1 and is fixed upon a short shaft 21 pivoted in the column wall and having a lever 22 fixed thereon inside the wall 5. A rod 23 is pivoted both with the lever 22 and with a lever 24 which is fixed upon a short shaft 25 pivoted in column 1, upon which is also fixed a lever 26 having a pivoted shoe 27 engaging with an annular groove 28 in the hub of the member 19. When the hand lever 20 is shifted in the one direction, by means of the mechanism described the clutch member 19 is forced into driving engagement with the clutch member 13 thereby driving shaft 16 from pulley 15, and when lever 20 is moved in the opposite direction, the members are disengaged and shaft 16 is idle.

Slidably keyed upon shaft 16 are gears 29, 30 and 31 adapted to be shifted for engagement one at a time with gears 32, 33 and 34 fixed on a shaft 35 rotatably supported in column 1. The gears 29, 30, and 31 are fixed together for movement as a unit and may be shifted to engage with the gears on shaft 35 by means of a hand lever 36 outside the wall 5 of column 1 and pivoted on a short shaft 37 to which is fixed, inside the column, a lever 38 provided with pivoted fork member 39 engaging with the sides of the gear 30.

A sleeve 40 is rotatably supported in the one end in a suitable bearing in a rib 41 of column 1 and at the other end in a boss 42 on the rear wall 3. Slidably keyed on the sleeve 40 is a unitary pair of gears 43 and 44 fixed together for movement in the one direction to engage gear 43 with gear 32 and in the other direction to engage gear 44 with the gear 33, such movement being effected by means of a hand lever 45 outside the wall 3 of the column and pivoted on a short shaft 46 upon which is fixed a lever 47 inside the column, having a pivoted shoe 48 engaging annular groove 49 in the hub of the gear 44.

A shaft 50 is in axial alignment with the sleeve 40 and is slidably keyed at the one end in an axial bore 51 of the sleeve 40 and at the other end in an axial bore 52 of a sleeve 53 rotatably supported in a boss 54 on the front wall of the column. A pinion 55 forms an integral part of the shaft 50 and fixed upon shaft 50 is a gear 56. The shaft 50, pinion 55, and gear 56 form a unit which may be shifted endwise in the one direction to cause the gear 56 to engage with gear 57 fixed on the spindle 10, or in the other direction to cause the pinion 55 to engage with a gear 58 fixed on the spindle 10, the shifting being effected by means of a hand lever 59 outside the wall of the column, which is fixed on a short shaft 60 pivoted in the column wall and provided inside the column with a lever 61 fixed thereon and having a pivoted shoe 62 engaging with an annular groove 63 in the hub of the gear 56.

By the mechanism described power transmitted from the drive pulley 15 may be caused to actuate spindle 10 if the clutch member 19 is shifted in the proper direction to cause engagement of the clutch members 13 and 19, and at a variety of speeds determined by the position of the shiftable gears which form the driving train. The sleeves 40 and 53 are fixed against axial movement and are of sufficient axial length to provide for receiving the ends of the shaft 50 in any position of its axial adjustment and of such additional length as to provide substantial support for the shaft when shifted in a direction giving least engagement with the bores of the respective sleeves. Thus by the construction described the rotating sleeve 53 provides an ample bearing surface for the shaft load when pinion 55 is engaged, which surface is situated close to the point of application of the load whereby to minimize the shaft deflection. The construction also materially reduces the space between the front face of the pinion 55 or gear 58 and the column face otherwise required in order to provide sufficient bearing when the shaft is moved to the left in the drawing while still providing space for the shaft to move to the right. This is of particular advantage both as to general space economy in the machine and in reducing the length of spindle through which heavy torsional strain is to be transmitted. Thus also, by the construction described the rotating sleeve 40 provides an ample bearing surface for the shaft load when gear 56 is engaged, which surface is situated to minimize the shaft deflection, and by the construction shown the axially stationary sleeve may be used for transmitting power to the shaft 50, whereby the power may be transmitted to the shaft with a minimum shaft length under torsional load.

It will be noted that the gears 57 and 58 are each solidly fixed upon the spindle 10 and the construction is such as to permit of the pinion 55 being relatively very small while still maintaining sufficient strength of the shaft 50, whereby gear 58 may be provided with a large number of teeth relative to the number of teeth in pinion 55, without being made so large in diameter as to increase the peripheral speed beyond desirable limits, and without increasing the diameter to an extent likely to cause interference with the overarm 9 when the overarm is placed at a normal desirable distance from the spindle 10.

The arrangement shown is also particularly well adapted to provide spindle 10 with maximum speeds and minimum speeds bearing a relatively great ratio to one another. The gear pair 55 and 58 transmit the motion of shaft 50 to the spindle 10 at a reduced rate. The gear pair 56 and 57 transmit the motion of the shaft 50 to spindle 10 at an increased rate and it is desirable that the reduction effected between pinion 55 and gear 58 should be as large as possible subject to the limitations previously noted, so that the gear 57 may not be reduced to an undesirable small diameter in order to obtain the speeding up required to give the desired relatively high ratio between the high and low speed of spindle 10, and for other reasons.

Various changes in the details of construction and arrangement of parts of the machine as here shown may be made, all of which it is desired to protect by Letters Patent to such extent as they may be equivalent to, or within the spirit and scope of the following claims.

I claim:

1. In a milling machine the combination of a column providing front and rear walls spaced apart, an axially stationary tool spindle journaled in said column walls and having its ends exposed outside said walls, a plurality of different diameter gears fixed on said spindle between said walls, a shaft parallel with said spindle and axially slidable, a plurality of gears fixed on said shaft and respectively adapted to mesh with the different spindle gears during the axial movement of said shaft, whereby to provide a change of rate between said shaft and spindle, and other rate change means connected to drive the first mentioned rate change means, the connection therefor including an axially stationary sleeve supported from one of said walls and having a bore in slidably splined engagement with said shaft.

2. In a milling machine the combination of a column providing front and rear walls spaced apart, an axially stationary tool spindle journaled in said column walls and having its ends exposed outside said walls, a plurality of gears fixed on said spindle between said walls, a shaft parallel with said spindle and axially slidable, a plurality of gears fixed on said shaft and respectively adapted to mesh with the different spindle gears during the axial movement of said shaft, said gears providing rate change means between said shaft and spindle, a plurality of axially stationary rotatable sleeves respectively journaled in the different walls and each providing a bore, the opposite ends of said shaft being splinedly fitted to slide in the bores of the respective sleeves, and other rate change means connected to drive the first mentioned rate change means through one of said sleeves.

3. In a milling machine the combination of a column providing front and rear walls spaced apart, an axially stationary tool spindle journaled in said column walls and having its ends exposed outside said walls, a plurality of gears including a relatively large gear, said gears each being fixed on said spindle between said walls, a shaft parallel with said spindle and axially slidable, a plurality of gears fixed on said shaft and respectively adapted to mesh with the different spindle gears during the sliding movement of said shaft, the shaft gear adapted to mesh with said large gear being relatively small diametered and integrally formed with said shaft, said gears providing rate change means between said shaft and spindle, other rate change means, and a transmission from said other rate change means to the first mentioned rate change means including means adapted to permit the axial movement of said shaft.

In witness whereof, I hereto affix my signature.

FRED A. PARSONS.